(12) United States Patent
Hiraoka et al.

(10) Patent No.: US 7,607,602 B2
(45) Date of Patent: Oct. 27, 2009

(54) REEL UNIT FOR SPINNING REEL

(75) Inventors: Hirokazu Hiraoka, Osaka (JP); Kenichi Sugahara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/125,066

(22) Filed: May 22, 2008

(65) Prior Publication Data

US 2008/0308663 A1 Dec. 18, 2008

(30) Foreign Application Priority Data

Jun. 15, 2007 (JP) ............................. 2007-158323

(51) Int. Cl.
*A01K 89/01* (2006.01)
(52) U.S. Cl. .................. 242/232; 242/228; 242/311
(58) Field of Classification Search .............. 242/228, 242/231, 232, 311, 312
See application file for complete search history.

(56) References Cited

U.S. PATENT DOCUMENTS

| 4,932,616 | A | | 6/1990 | McMickle et al. | |
|---|---|---|---|---|---|
| 6,056,220 | A | * | 5/2000 | Cockerham et al. | 242/233 |
| 6,880,776 | B2 | * | 4/2005 | Kitajima | 242/310 |
| 6,902,127 | B2 | * | 6/2005 | Nishikawa | 242/311 |
| 6,971,599 | B2 | * | 12/2005 | Sugawara | 242/231 |
| 7,028,937 | B2 | * | 4/2006 | Hitomi et al. | 242/311 |
| 7,275,705 | B1 | * | 10/2007 | Wong | 242/311 |
| 7,413,138 | B2 | * | 8/2008 | Kitajima et al. | 242/311 |

FOREIGN PATENT DOCUMENTS

| EP | 0986953 | A | 3/2000 |
|---|---|---|---|
| EP | 1166628 | A | 1/2002 |
| JP | S53-32191 | U1 | 3/1978 |
| JP | 2001-103879 | A | 4/2001 |
| JP | 2001-299161 | A | 10/2001 |

* cited by examiner

*Primary Examiner*—Emmanuel M Marcelo
(74) *Attorney, Agent, or Firm*—Shinjyu Global IP

(57) ABSTRACT

A reel unit 2 for a spinning reel includes a housing unit 2a, a lid portion 2b, and a returning member 28. The housing unit 2a includes a cylindrical portion 27 and a somewhat semicircular first flange portion 24a arranged behind the cylindrical portion 27. The lid portion 2b has a somewhat semicircular second flange portion 24b arranged behind and forming a gap 27b with the rear surface of the cylindrical portion 27. The lid portion 2b is detachably coupled to the housing unit 2a. The returning member 28 is detachably mounted in gap 27b and includes a plate-like arranging portion 28a disposed in gap 27b and a protrusion 28b gradually protruding from a front side of the arranging portion 28a to face the first flange portion 24a. The protrusion 28b has a first sloped surface 28c contactable with a bail tripping mechanism.

9 Claims, 8 Drawing Sheets

REEL UNIT FOR SPINNING REEL

CROSS-REFERENCE TO RELATED APPLICATIONS

This application claims priority under 35 U.S.C. §119 to Japanese Patent Application No. 2007-158323 filed on Jun. 15, 2007. The entire disclosure of Japanese Patent Application No. 2007-158323 is hereby incorporated herein by reference.

BACKGROUND OF THE INVENTION

1. Field of the Invention

The present invention relates to a reel unit. In particular, the present invention relates to a reel unit for a spinning reel on which a rotor having a bail tripping mechanism is rotatably supported thereon.

2. Background Information

The spinning reel includes a reel unit having a rod attachment leg portion adapted to be mounted to a fishing rod, a line-winding spool mounted on the reel unit and able to shift front and rear, and a rotor mounted rotatably on the reel unit for winding a fishing line around the spool. The reel unit includes a housing unit with a mechanism accommodating space in which various mechanisms such as a rotation mechanism for the rotor are mounted and a lid portion for covering the mechanism accommodating space.

A bail arm that is pivotal between a line-winding posture and a line-releasing posture is mounted on the rotor. The rotor has a first and a second rotor arms, and the bail arm is mounted on the front ends of the first and second rotor arms. The bail arm includes a first bail supporting member, a second bail supporting member, and a bail. The first bail supporting member is fitted pivotally on the front end of a first rotor arm. The first bail supporting member has a line roller on the front end thereof for guiding the fishing line. The second bail supporting member is fitted pivotally on the front end of a second rotor arm. The bail connects the two bail supporting members. When the bail arm is pivoted into the line-releasing posture, a bail tripping mechanism provided on the first rotor arm returns the bail arm back into the line-winding posture when the rotor starts rotating in the line-winding direction. A returning member is provided on the reel unit for making the bail tripping mechanism operate. The bail tripping mechanism has a moving member that moves in a disjunctive direction from the reel unit with the movement of the bail arm. The returning member has a sloped surface in a direction away from the reel unit for pressing the moving member in response to the rotation of the rotor in the line-winding direction. Usually, the lid portion is disposed to the right side when the reel is viewed from the front side, and the rotor rotates in the clockwise direction during line-winding when the reel is viewed from the front side. For this reason, the sloped surface is formed to protrude out to the front side gradually in the clockwise direction.

The timing for reversing the bail arm from the line-releasing posture to the line-winding posture is often times set when the first bail supporting member having the line roller is in the position away from the fishing rod, that is, when the first bail supporting member is disposed near the joined portion between the housing unit and the lid portion. In the bail arm, the first bail supporting member is disposed in a position nearest to the fingers of the angler holding the fishing rod. For this reason, if the bail arm is reversed at this timing, the first bail supporting member moves away from the fingers. As a result, it becomes difficult for the first bail supporting member to be in contact with the fingers that hold the fishing rod even if the bail arm is reversed, and this is preferable from a safety standpoint.

For this reason, the returning member is arranged in a position as far away as possible from the rod attachment leg portion of the reel unit. With the returning member arranged in the reel unit, something that has been known in the past is (for example, refer to Japanese Utility Model Laid-Open Publication No. 53-32191) something formed integrally on the front surface of the housing unit, or something (for example, refer to Japanese Patent Laid-Open Publication No. 2001-299161) formed as a separate body from the housing unit and held in place between the housing unit and the lid portion.

On the other hand, there has been something of (for example, refer to Japanese Patent Laid-Open Publication No. 2001-103879) a cylindrical portion provided on the front portion of a reel unit, and an anti-reverse mechanism able to be mounted on the front portion of the cylindrical portion for preventing the rotor from rotating reversely. The cylindrical portion is formed integrally on the front side of a first flange portion on the housing unit of the reel unit. The first flange portion is formed so as to create a circular shape with a second flange portion formed on the front portion of the lid portion, and formed for covering the rear surface of the rotor with the second flange portion. A small gap is produced between the second flange portion and the rear surface of the cylindrical portion such as for mounting a seal member.

In conventionally known configuration where the returning member is formed integrally on the front surface of the housing unit, it is not necessary to have a fixation portion, compared to when it is formed as a separate body. Thus, it is not necessary to have a space and a fixation structure for fixation purpose. The configuration of the reel unit becomes simple. However, since, considering from a safety standpoint, the returning member has to be formed near the joined portion of housing unit and the lid portion, the sloped surface has to be formed on only the housing unit. For this reason, the slope of the sloped surface becomes steep, and a big rotating force, the so-called return force, is necessary for returning the bail arm by turning the handle.

In addition, in conventionally known configuration where the returning member is formed integrally on the front surface of the housing unit, it may be desirable to change the return force, depending on the type of fishing and the specification such as whether or not a bail braking mechanism is included for putting brakes on the bail, and so forth. However, to change the slope of the sloped surface of the returning member, it is necessary to correct the mold of the housing unit that is usually manufactured in a die press. As a result, it is difficult to change the slope of the sloped surface.

In conventionally known configuration where the returning member is fixed between the housing unit and the lid portion as a separate body, the sloped surface can be formed to be gentle, since the sloped surface can be formed on the lid portion side. However, when the moving member moves onto the sloped surface, stress will concentrate on the fixation portion, and it is necessary to have a comparatively large space for the fixation portion to maintain the strength of the fixation portion.

SUMMARY OF THE INVENTION

It is an object of the present invention to provide the returning member with a gradual sloped surface and to reduce the space for holding the returning member in place in a reel unit for a spinning reel.

It is another object of the present invention to allow the sloped surface of the returning member, in a reel unit for a spinning reel having a returning portion, to be easily changed.

According to one aspect of the present invention, a reel unit for a spinning reel is provided on which a rotor having a bail tripping mechanism and a spool. The bail tripping mechanism is arranged to return a bail arm, pivotable between a line-winding posture and a line-releasing posture, from the line-releasing posture to the line-winding posture. The spool is arranged to move forward and rearward along a spool shaft. The reel unit includes a housing unit, a lid portion, a rod attachment leg portion and a returning member. The housing unit includes a cylindrical portion, a first flange portion and a mechanism accommodating space. The cylindrical portion is disposed on a front portion the housing unit so that a center of the cylindrical portion coincides with a center of a rotation shaft of the rotor. The first flange portion is arranged behind the cylindrical portion and has a substantially semicircular shape. The center of the first flange portion coincides with the center of the cylindrical portion. The mechanism accommodating space is formed in a rear side of the first flange portion. The lid portion has a second flange portion with a substantially semicircular shape. The second flange portion forms a circular shape with the first flange portion. The first and second flange portions are arranged behind and form a gap with a rear surface of the cylindrical portion. The lid portion detachably coupled to the housing unit so as to cover the mechanism accommodating space. The rod attachment leg portion is disposed on either the housing unit or the lid portion. The returning member is detachably mounted in the gap between the cylindrical portion and the second flange portion. The returning member returns the bail arm from the line-releasing posture to the line-winding posture. The returning member includes a plate-like arranging portion and a protrusion. The plate-like arranging portion is disposed in the gap between the cylindrical portion and the second flange portion. The protrusion gradually protrudes from a front side of the arranging portion to face the first flange portion along the line-winding direction of the rotor. The protrusion has a first sloped surface contactable with the bail tripping mechanism.

With this reel unit for a spinning reel, the plate-like arranging portion of the returning member is mounted in the gap between the rear surface of the cylindrical portion and the front surface of the second flange portion of the lid portion that is arranged opposite to it, and the first sloped surface able to be in contact with the bail tripping mechanism is provided on the protrusion that is formed all the way to a position on which it can face the first flange portion. If the rotor rotates in the line-winding direction when the bail arm is in the line-releasing posture, the bail tripping mechanism is in contact with the first sloped surface that extends from the second flange portion of the lid portion to a position facing the first flange portion, and the bail arm returns to the line-winding posture. Here, since the plate-like arranging portion of the returning member can be arranged in the gap between the second flange portion and the cylindrical portion, by inserting the plate-like arranging portion into the gap between the cylindrical portion and the second flange portion, the returning member can be held in place by being sandwiched by the cylindrical portion and the second flange portion, and it can be fixed by being locked to either the cylindrical portion or the second flange portion. Since this arranging portion is in a plate-like shape, concentration of stress will not occur easily even if a protrusion that faces the first flange portion is provided, and the space for holding the returning member in place can be reduced. In addition, since the protrusion is formed from the arranging portion that can be arranged on the second flange portion, the first sloped surface can be formed not only on the housing unit, but also on the lid portion side. For this reason, the slope of the first sloped surface can be made gentle, and the bail arm can be returned with a small force.

A reel unit for a spinning reel, according to another aspect of the present invention, wherein the first flange portion further has a returning portion returning the bail arm from the line-releasing posture to the line-winding posture. The returning portion includes a second sloped surface formed on a front surface of the first flange portion along the line-winding direction. The second sloped surface is steeper than the first sloped surface.

A reel unit for a spinning reel, according to still another aspect of the present invention, wherein the returning member has a third sloped surface positioned facing the second sloped surface and engaging with the second sloped surface. In this case, by mounting the returning member in the reel unit in which the returning portion having the second sloped surface is already formed, the third sloped surface of the returning member engages with the second sloped surface of the returning portion, and the returning portion is covered by the returning member. As a result, the contacting sloped surface with which the bail tripping mechanism touches is not the second sloped surface, but the first sloped surface having a slope more gentle than the second sloped surface. For this reason, even with the reel unit with which the returning portion is formed integrally, by mounting the returning member, the slope of the contacting sloped surface can be made gentle, and it is possible to change the slope of the contacting sloped surface.

A reel unit for a spinning reel, according to another aspect of the present invention, wherein a cutout portion is formed on the inner peripheral side of the second flange portion.

A reel unit for a spinning reel, according to a further aspect of the present invention, wherein the arranging portion has at least one projection being locked to an edge portion of the cutout portion of the second flange portion and is sandwiched by the second flange portion and the cylindrical portion. In this case, since the returning member has at least one projection locked by an edge portion of the cutout, by fixing the lid portion to the housing unit in the state that the returning member is locked to the edge portion of the cutout portion, the returning member is sandwiched in the gap between the cylindrical portion and the second flange portion, and the returning member can be easily fixed without using any tools.

In addition, here "sandwiched" refers to the state of the returning member being arranged in the gap between the rear surface of the cylindrical portion and the front surface of the second flange portion, and not only includes the state of the arranging portion of the returning member being sandwiched and in contact with both the cylindrical portion and the second flange portion, but also includes the state of the plate-like portion of the arranging portion being arranged in the gap between the cylindrical portion and the second flange portion, with the projection locked with the cutout portion, and the arranging portion being in contact with one of the two.

A reel unit for a spinning reel, according to still a further aspect of the present invention, wherein the arranging portion has at least one fitting portion that fits with either the cylindrical portion or the second flange portion and is sandwiched by the second flange portion and the cylindrical portion. In this case, since returning member has a fitting portion that fits with the cylindrical portion or the second flange portion, by fixing the lid portion to the housing unit in the state that the fitting portion of the arranging portion is fitted into the rear surface of the cylindrical portion or the second flange portion, the returning member is sandwiched in the gap between the cylindrical portion and the second flange portion, and the returning member can be easily fixed without using any tools.

In addition, the term "sandwiched" refers to the state of the returning member being arranged in the gap between the rear surface of the cylindrical portion and the front surface of the second flange portion, and not only includes the state of the arranging portion of the returning member being sandwiched and in contact with both the cylindrical portion and the second flange portion, but also includes the state of the plate-like portion of the arranging portion being arranged in the gap between the cylindrical portion and the second flange portion, with the fitting portion fitted into the cylindrical portion or the second flange portion, and the arranging portion being in contact with one of the two.

A reel unit for a spinning reel, according to yet a further aspect of the present invention, wherein the arranging portion has a projection as the fitting portion for fitting in a concave portion formed on either the cylindrical portion or the second flange portion. In this case, if the concave portion is on the cylindrical portion side, by forming the concave portion by opening a hole through from the front side of the cylindrical portion, the concave portion can be formed easily even if the housing unit having a shape that is complicated is formed by a mold, and also, since the shape of the returning member is simple compared to the housing unit, the projection can be easily formed in the case of forming the returning member by a mold. In addition, if the concave portion is on the second flange portion side, the concave portion can be formed easily since it is only necessary to form the concave portion from the front surface of the second flange portion, and also, since the returning member has a simple shape compared to the housing unit, the projection can be formed easily if the returning member is formed by a mold.

A reel unit for a spinning reel, according to another aspect of the present invention, wherein the arranging portion can be fixed to by being screwed to either the cylindrical portion or the second flange portion. In this case, since the returning member can be fixed to by being screwed to the rear surface of the cylindrical portion or the front surface of the second flange portion, the returning member can be fixed firmly so that it does not rattle.

According to this invention, since the plate-like arranging portion of the returning member can be arranged in the gap between the second flange portion and the cylindrical portion, by inserting the plate-like arranging portion in the gap between the cylindrical portion and the second flange portion, the returning member can fixed by being sandwiched by the cylindrical portion and the second flange portion, and it can be held in place by being locked to either the cylindrical portion or the second flange portion. Since this arranging portion is in a plate-like shape, the concentration of stress will not occur easily even if the protrusion facing the first flange portion is arranged, and the space for fixing the returning member can be reduced. In addition, since the first sloped surface can be formed on the protrusion formed on the arranging portion able to be arranged in the gap between the second flange portion and the cylindrical portion, the first sloped surface can be formed not only on the housing unit, but also on the lid portion side. For this reason, the slope of the first sloped surface can be made gentle, and the bail arm can be returned with a small force.

According to another aspect of the present invention, there is provided a spinning reel that includes a spool, a rotor, a bail arm, a bail tripping mechanism and a reel unit. The rotor is arranged to guide a fishing line on a peripheral surface of the spool. The spool is arranged to move forward and rearward along a spool shaft. The bail arm is pivotable between a line-winding posture and a line-releasing posture. The bail tripping mechanism is arranged to return the bail arm from the line-releasing posture to the line-winding posture. The reel unit rotatably supports the rotor and includes a housing unit, a lid portion, a rod attachment leg portion and a returning member. The housing unit includes a cylindrical portion, a first flange portion and a mechanism accommodating space. The cylindrical portion is disposed on a front portion the housing unit so that a center of the cylindrical portion coincides with a center of a rotation shaft of the rotor. The first flange portion is arranged behind the cylindrical portion and has a substantially semicircular shape. The center of the first flange portion coincides with the center of the cylindrical portion. The mechanism accommodating space is formed in a rear side of the first flange portion. The lid portion has a second flange portion with a substantially semicircular shape. The second flange portion forms a circular shape with the first flange portion. The first and second flange portions are arranged behind and form a gap with a rear surface of the cylindrical portion. The lid portion detachably coupled to the housing unit so as to cover the mechanism accommodating space. The rod attachment leg portion is disposed on either the housing unit or the lid portion. The returning member is detachably mounted in the gap between the cylindrical portion and the second flange portion. The returning member returns the bail arm from the line-releasing posture to the line-winding posture. The returning member includes a plate-like arranging portion and a protrusion. The plate-like arranging portion is disposed in the gap between the cylindrical portion and the second flange portion. The protrusion gradually protrudes from a front side of the arranging portion to face the first flange portion along the line-winding direction of the rotor. The protrusion has a first sloped surface contactable with the bail tripping mechanism.

According to another embodiment of the present invention, by mounting the returning member in the reel unit in which the returning portion having the second sloped surface is already formed, the third sloped surface of the returning member engages with the second sloped surface of the returning portion, and the returning portion is covered by the returning member. As a result, the sloped surface with which the bail tripping mechanism touches is not the second sloped surface, but the first sloped surface with a slope more gentle. For this reason, even with the reel unit with which the returning portion is formed integrally, the slope of the contacting sloped surface can be made gentle, and the slope of the contacting sloped surface can be changed, by mounting the returning member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
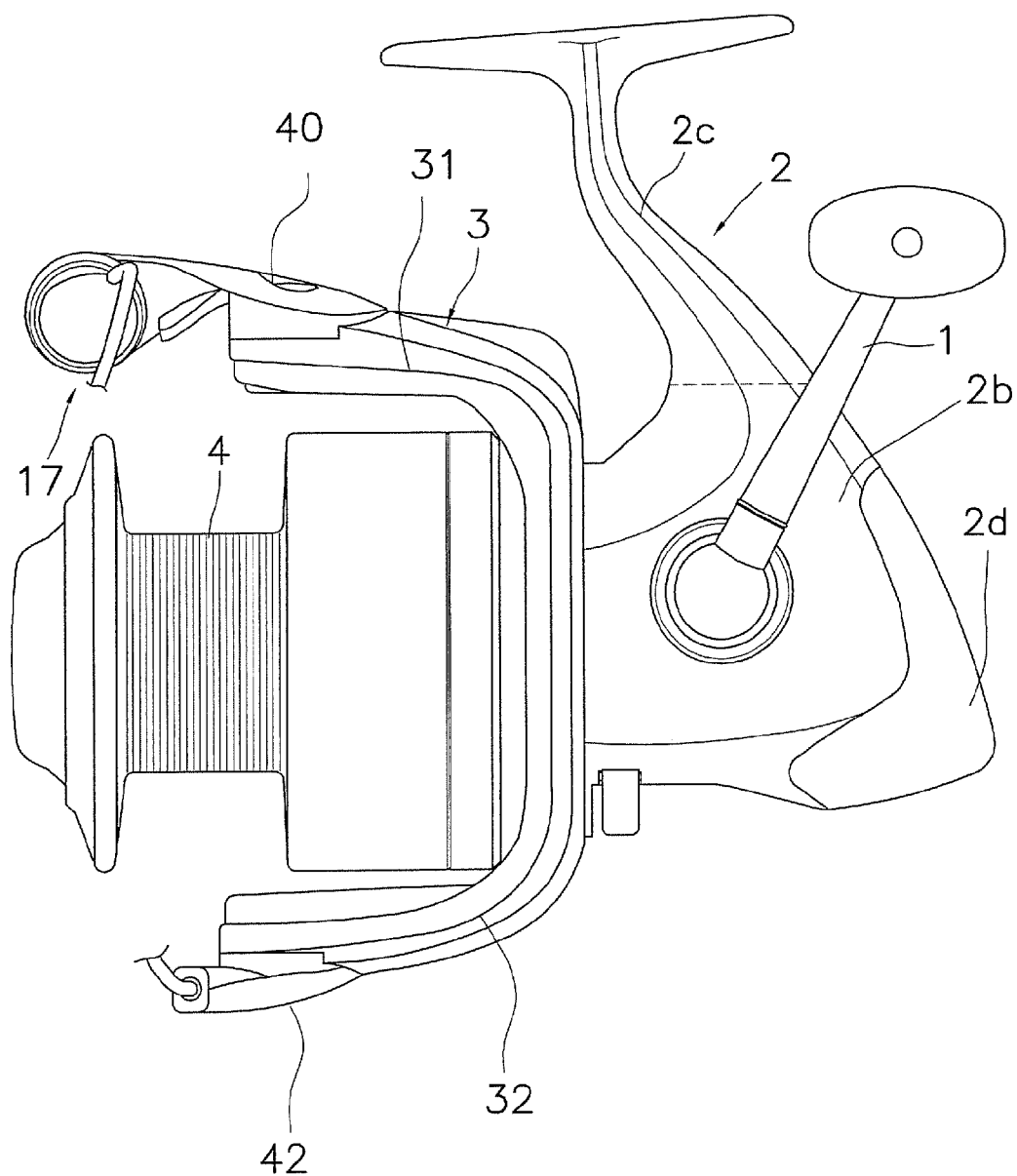
FIG. 1 is a side elevation of a spinning reel according to an embodiment of the present invention.
Figure 2:
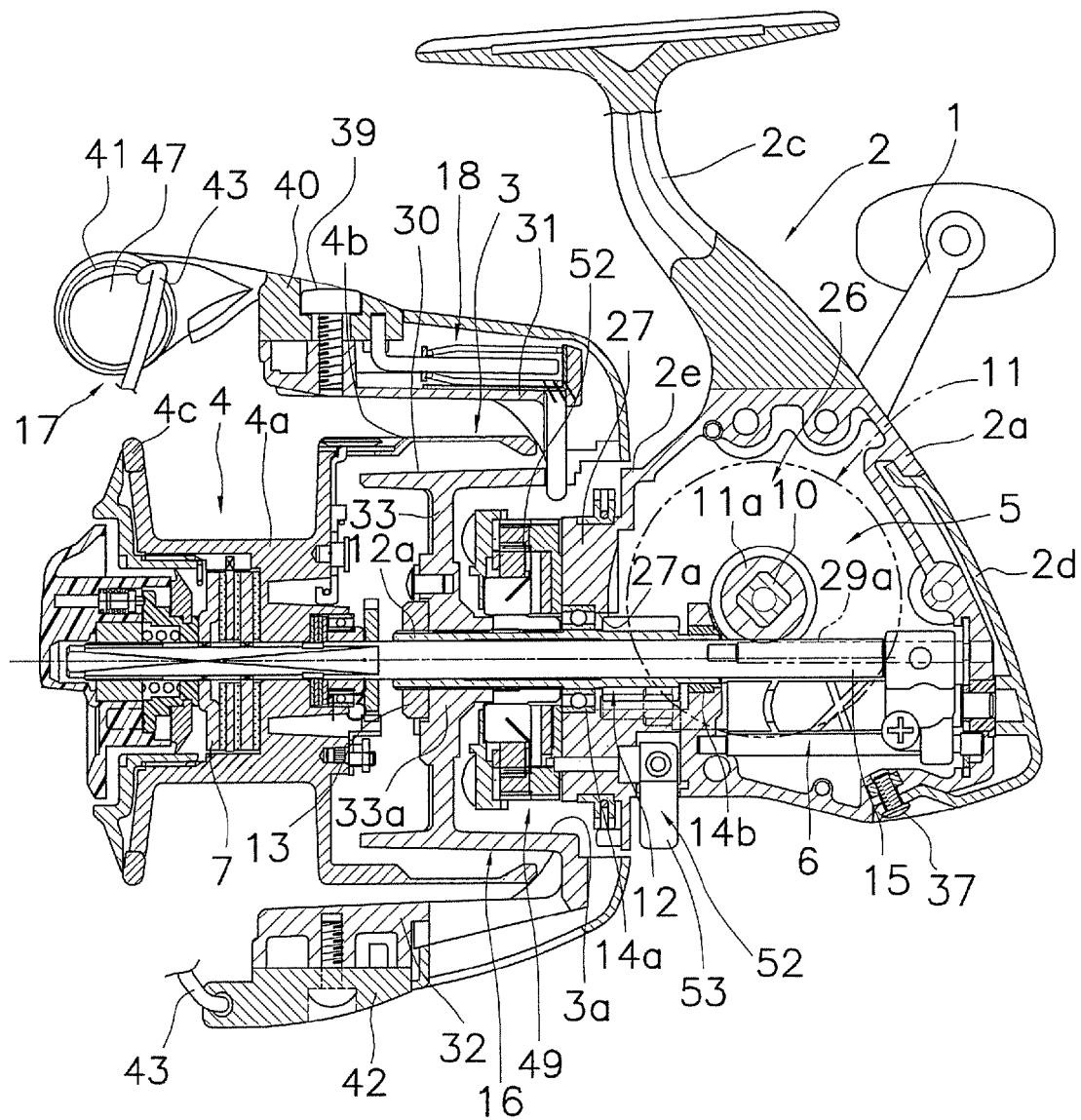
FIG. 2 is a side sectional view of the spinning reel.

As shown in FIGS. 1 and 2, a spinning reel according to an embodiment of the present invention is provided with a reel unit 2 rotatably supporting a handle 1 and mounted to a fishing rod (not shown), a rotor 3, a spool 4, a spool shaft 15, a rotor drive mechanism 5, an oscillating mechanism 6, and a drag mechanism 7. The rotor 3 has a bail arm 17. The rotor 3 is mounted at the front of the reel unit 2 and is mounted to rotate back and forth around a shaft. The fishing line guided by the rotor 3 is wound around the outer peripheral surface of the spool 4, which is disposed at the front of the rotor 3 and can be shifted front and rear. The spool shaft 15 mounted on the reel unit 2 is movable back and forth in the axial direction. The spool 4 is mounted on the front end of the spool shaft 15 via the drag mechanism 7. The rotor drive mechanism 5 transfers the rotation of the handle 1 to the rotor 3. The oscillating mechanism 6 causes the spool shaft 15 to reciprocate back and forth in response to rotation of the rotor drive mechanism 5 and winds the fishing line around the spool 4 evenly. In addition, the handle 1 can be attached to either the left side of the reel unit 2, shown in FIG. 1, or the right side of the reel unit 2, shown in FIG. 2.

As shown in FIGS. 1 to 4, the reel unit 2 includes a housing unit 2a, a lid portion 2b, a rod attachment leg portion 2c, and a returning member 28. The housing unit 2a supports the rotor 3 and the spool 4. The lid portion 2b is detachably fastened to the housing unit 2a by a plurality of (e.g., three) fastening bolts 38. The rod attachment leg portion 2c that has a substantially T-shaped is arranged on the lid portion 2b, and the returning member 28 is arranged at the front of the lid portion 2b. The rear ends of the housing unit 2a and of the lid portion 2b are covered by a cover member 2d fixed to the housing unit 2a. At the front of the reel unit 2, a circular flange portion 2e is formed. The circular flange portion 2d has a first flange portion 24a and a second flange portion 24b. The first flange portion 24a and the second flange portion 24b are integrally formed with the housing unit 2a and the lid portion 2b, respectively.

Figure 3:
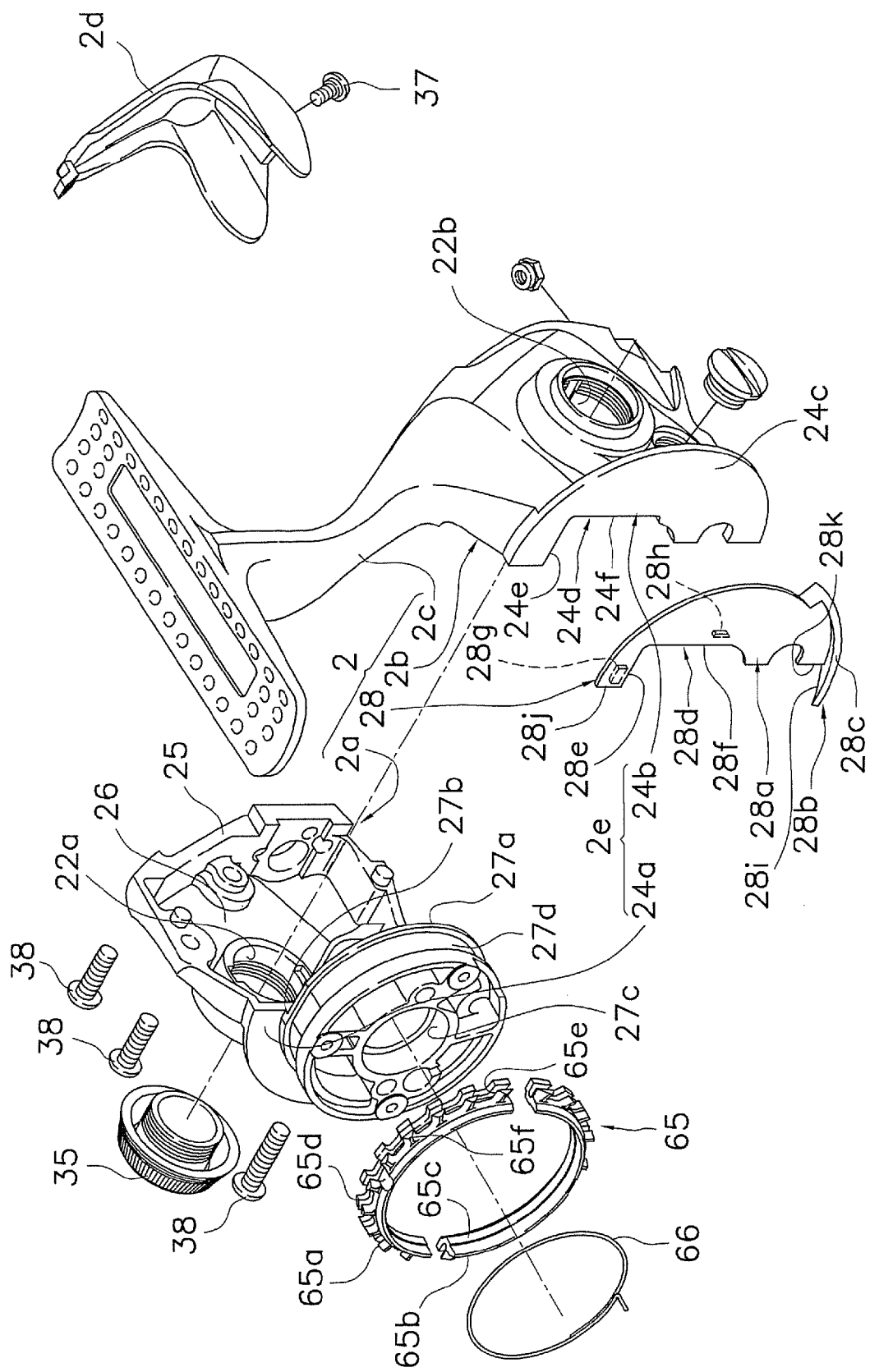
FIG. 3 is an exploded perspective view of a reel unit of the spinning reel.

The housing unit 2a, for instance, is made of synthetic resin, or a lightweight metal, such as aluminum alloy, magnesium alloy, or the like, and can be manufactured by forging or formed by a die. As shown in FIGS. 2 and 3, the housing unit 2a includes an opening 25 formed on the side thereof and a mechanism accommodating space 26 formed in the interior thereof. The housing unit 2a also includes a cylindrical portion 27. The cylindrical portion 27 is disposed in the interior of a circular depression 3a formed in the rotor 3 to the side of the reel unit 2. The cylindrical portion 27 rotatably supports a pinion gear 12 (to be described later) which is the rotation shaft of the rotor 3. The upper portion (mounting side to the fishing rod) of the housing unit 2a includes roughly a little under half of the reel unit 2 in the widthwise direction, and the lower portion thereof protruding out further to the side of the lid portion 2b includes roughly a little over half of the reel unit 2 in the widthwise direction, and so the lower portion is formed bigger than the upper portion. For this reason, the upper portion of the lid portion 2b includes roughly a little over half of the reel unit 2 in the widthwise direction, and the lower portion thereof includes roughly a little under half of the reel unit 2 in the widthwise direction, as a result of the protruding of the housing unit 2a.

Figure 6:
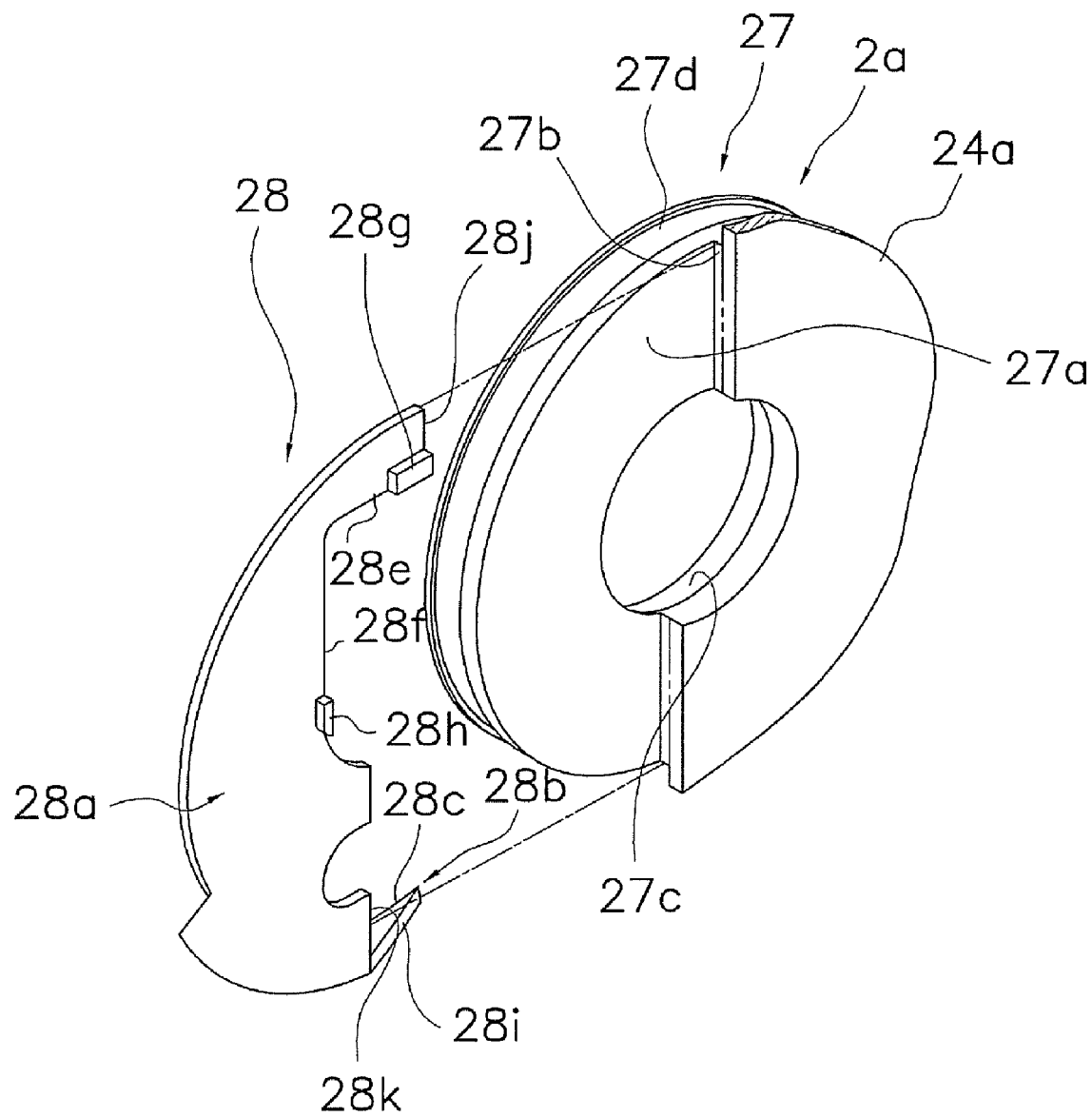
FIG. 6 is a perspective view of a cylindrical portion and a returning member.

As shown in FIG. 2, the rotor drive mechanism 5 and the oscillating mechanism 6 are arranged in the mechanism accommodating space 26. The center of the cylindrical portion 27 is arranged to coincide with the center of the pinion gear 12, and on the rear portion thereof, the center of the roughly semicircular first flange portion 24a is formed to coincide with the center of the cylindrical portion 27. A gap 27b of about 0.5 mm to 3 mm is formed, as shown in FIGS. 3 and 6, between the rear surface 27a of the cylindrical portion 27 protruding out to the side of the lid portion 2b from the first flange portion 24a, and the front surface 24c of the second flange portion 24b. In addition, in FIG. 6, the gap 27b exists between the portion shown by the two-dot chain line and the rear surface 27a of the cylindrical portion 27, and the first flange portion 24a is formed in the back (right side in FIG. 6) with a thickness ranged from the portion shown in two-dot chain line.

A supporting opening 27c, through which a shaft bearing for supporting the pinion gear 12 is mounted, is formed in the center of the cylindrical portion 27. A circular mounting groove 27d is formed on the outer peripheral surface of the cylindrical portion 27 for mounting a brake member 65 for putting brakes on the rotor 3. A one-way clutch 52 of an anti-reverse mechanism 49 (to be described later) is screwed to the front surface of the cylindrical portion 27.

The lid portion 2b, for instance, is made of synthetic resin, or a lightweight metal, such as aluminum alloy, magnesium alloy, or the like, and can be manufactured by forging or formed by a die. As shown in FIG. 3, the second flange portion 24b is integrally formed with the lid portion 2b, so that the opening 25 of the housing unit 2a is covered, and a space can be formed in the interior. The rod attachment leg portion 2c is integrally formed on the lid portion 2b.

Figure 4:
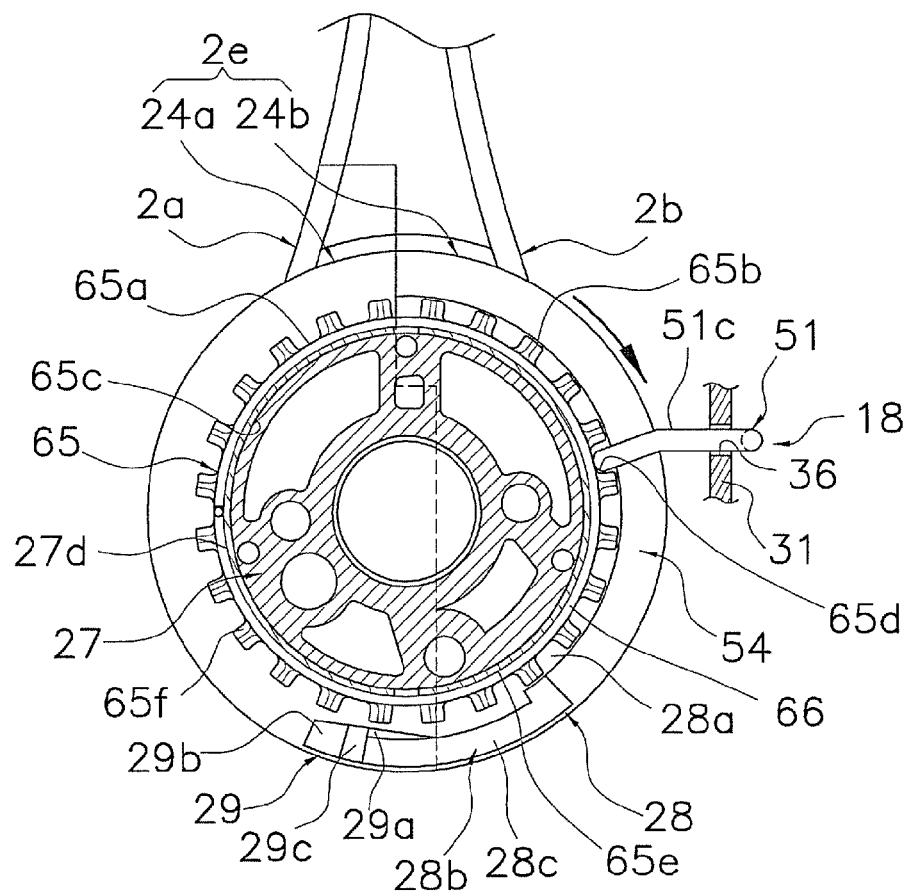
FIG. 4 is a front partial diagrammatic view of the reel unit, showing a bail tripping mechanism.
Figure 5:
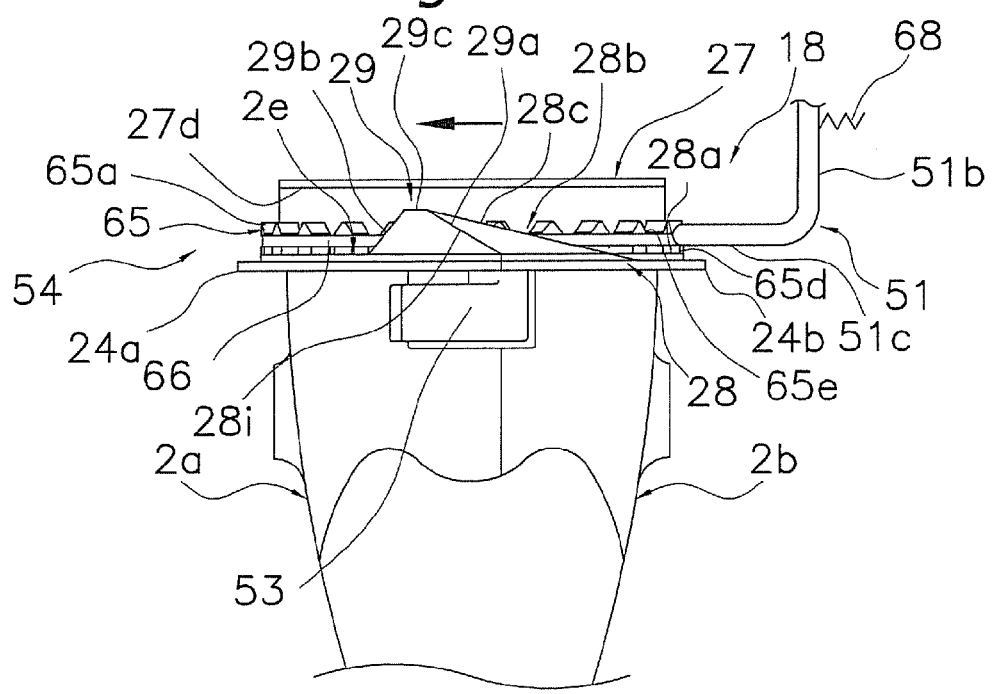
FIG. 5 is a bottom partial diagrammatic view of the reel unit, showing the bail tripping mechanism.

As shown in FIGS. 3 to 5, the flange portion 2e has a disk-shaped and arranged substantially on the same surface as an end surface of the depression 3a, so that the circular depression 3a (refer to FIG. 1) formed on the rear portion of the rotor 3 is blocked off. As described previously, the flange portion 2e includes the roughly semicircular first flange portion 24a that is integrally formed with the housing unit 2a and the semicircular second flange portion 24b, with which the first flange portion 24a forms a circular shape, integrally formed with the lid portion 2b. A returning portion 29 is integrally formed with the bottom portion of the first flange portion 24a and is capable of being in contact with a bail tripping mechanism 18, to be described later. The returning portion 29 is substantially shaped like a mountain, protruding out to the front, and has a second sloping surface 29a on the upstream side of the rotor 3 in the line-winding rotating direction and engages with a third sloped surface 28i of a returning member 28, to be described later, a fourth sloped surface 29b more sloped than the second sloped surface 29a on the downstream side, and a flat surface 29c arranged between the two. Furthermore, the returning portion 29 can be in contact with the bail tripping mechanism 18 even if the returning member 28 is not mounted. Here, since the lower portion of the housing unit 2a includes a little over half of the reel unit 2 in the widthwise direction, the protrusion starting position of the second sloped surface 29a on the upstream side of the rotor 3 in the line-winding direction can be arranged more on the upstream side than the midway position of the reel unit 2, even if the returning portion 29 is integrally formed with the first flange portion 24a.

The second flange portion 24b is formed to have the same thickness as the first flange portion 24a, and a cutout portion 24d having a horizontal edge portion 24e and a vertical edge portion 24f is formed on the inner peripheral side thereof. The cutout portion 24d is arranged for making the disposition of the pinion gear 12 and the like easy.

In addition, as shown in FIG. 3, shaft supporting openings 22a, 22b are each provided for rotatably supporting two ends of a master gear shaft 11a (to be described later) on the side surfaces of the housing unit 2a and the lid portion 2b. The shaft supporting opening on the opposite side of the mounting side of the handle 1 is closed off by a waterproof cap 35 being screwed therein.

As shown in FIGS. 3 to 6, the returning member 28 is detachably mounted in a gap between the rear surface 27a of the cylindrical portion 27 and the front surface 24c of the second flange portion 24b. The returning member 28 is provided for returning the bail arm 17 (to be described later) back to the line-winding posture from the line-releasing posture through the bail tripping mechanism 18 by being in contact with the bail tripping mechanism 18. The returning member 28 engages with the returning portion 29 formed on the first flange portion 24a.

The returning member 28 includes a plate-like arranging portion 28a arranged in the gap 27b between the front surface of the second flange portion 24b and the rear surface 27a of the cylindrical portion 27, and a protrusion 28b extending from the arranging portion 28a to a position in which it can face the first flange portion 24a, along the line-winding rotation direction of the rotor 3.

The arranging portion 28a is basically the same plate-like portion as the second flange 24b and has somewhat a semi-circular shape with a diameter a little smaller than the second flange portion 24b. The arranging portion 28a has a thickness the same as or slightly thinner than the gap 27b between the front surface of the second flange portion 24b and the rear surface 27a of the cylindrical portion 27. A cutout portion 28d is formed to be slightly more into the inner side than the cutout portion 24d, on the inner peripheral side of the arranging portion 28a. The cutout portion 28d includes a horizontal edge portion 28e and a vertical edge portion 28f, each more into the inner side than the horizontal edge portion 24e and the vertical edge portion 24f of the cutout portion 24d. The cutout portion 28d also includes a plurality of (for example, two) projections 28g, 28h formed on the rear surface thereof, each locking with the horizontal edge portion 24e and the vertical edge portion 24f of the cutout portion 24d. The linear inner edge surfaces 28j, 28k on two sides of the cutout portion 28d of the arranging portion 28a are capable of being in contact with the end of the gap 27b formed between the cylindrical portion 27 and the second flange portion 24b. By locking this kind of projections 28g, 28h to the cutout portion 24d, even if the arranging portion 28a of the returning member 28 is formed only slightly thinner than the gap 27b, the returning member 28 will not rattle easily, through the inner edge surfaces 28j, 28k of the returning member 28 being in contact with the end surface of the gap 27b.

The protrusion 28b is formed to engage with the returning portion 29, with an arc bigger than the outer peripheral surface of the cylindrical portion 27 from the outer peripheral portion of the arranging portion 28a. A first sloped surface 28c of the protrusion 28b is formed to protrude out gradually from the arranging portion 28a to the front side, and extends towards the front surface of the first flange portion 24a so as to cover the second sloped surface 29a of the returning portion 29. A third sloped surface 28i is formed on the rear surface that recedes from the first flange portion 24a of the protrusion 28b, to engage and to be in contact with the second sloped surface 29a. As a result, the third sloped surface 28i touches the second sloped surface 29a, and the protrusion 28b is supported by the returning portion 29. For this reason, even if the bail tripping mechanism 18 touches and presses the first sloped surface 28c, the first sloped surface 28c will not rattle.

A cover member 2d, for example, is coated with a synthetic resin, such as ABS resin or the like, or a stainless alloy is used, so that it is made to be scratch resistant, to protect the most fragile portion of the reel unit 2. The bottom portion of the cover member 2d is screwed to the housing unit 2a by a screw 37 and the upper portion thereof is elastically locked to the housing unit 2a.

As shown in FIG. 2, the rotor drive mechanism 5 includes the master gear 11 that is made up of a face gear rotating with the handle shaft 10 to which the handle 1 is fixed, and the pinion gear 12 that meshes with this master gear 11. The master gear 11 includes the master gear shaft 11a with which the handle shaft 10 is coupled to be able to rotate together with the master gear shaft 11. The master gear shaft 11a can be provided integrally with or as a separate body from the master gear.

The pinion gear 12, which is the rotation shaft of the rotor 3, has a tubular shape, with a front portion 12a thereof passing through the center portion of the rotor 3. The pinion gear 12 is fixed to the rotor 3 by a nut 13. The intermediate portion and the rear end portion of the pinion gear 12 in the shaft direction thereof are both supported rotatably in the reel unit 2 via a shaft bearing 14a mounted in the cylindrical portion 27 and a shaft bearing 14b mounted in the housing unit 2a. A spool shaft 15 passes through on the inner peripheral side of the pinion gear 12.

The oscillating mechanism 6 is a mechanism for moving the spool shaft 15 coupled with the center portion of the spool 4 via the drag mechanism 7 in the front and rear direction, and moving the spool 4 in the same direction.

As shown in FIG. 2, the rotor 3 includes a rotor body 16, a bail arm 17 mounted so as to pivot into the line-releasing posture and line-winding posture on the front end of the rotor body 16, and a bail tripping mechanism 18 mounted in the rotor body 16 for returning the bail arm 17 back into the line-winding posture from the line-releasing posture.

The rotor body 16 includes a cylindrical portion 30 mounted rotatably around the spool shaft 15 in the housing unit 2a and a first and a second rotor arms 31, 32 facing each other on the sides of the cylindrical portion 30. The cylindrical portion 30 and the two rotor arms 31, 32 are, for example, made of aluminum alloy and integrally formed.

A front wall 33 is formed on a front portion of the cylindrical portion 30. A boss portion 33a is formed in the center portion of the front wall 33. A through-hole is formed in the center of the boss portion 33a, and the front portion 12a of the pinion gear and the spool shaft 15 passes through this through-hole. The nut 13 is arranged to fix the rotor 3 on the front portion of the front wall 33.

As shown in FIG. 2, the first and the second rotor arms 31, 32 extend to the front side while both curving out convexly from the rear portion outer peripheral surface that face the cylindrical portion 30. A first bail supporting member 40 that makes up the bail arm 17 is pivotally mounted on the outer peripheral side on the tip of the first rotor arm 31. The bail tripping mechanism 18 is mounted in the interior of the first rotor arm 31. A second bail supporting member 42 is pivotally mounted on the outer peripheral side on the tip of the second rotor arm 32.

The first bail supporting member 40 is pivotally mounted on the first rotor arm 31 by a mounting pin 39 screwed into the tip of the first rotor arm 31. This mounting pin 39 is made up of a bolt with a hexagon opening having a head portion, which a fishing line is not likely to be caught by it.

As shown in FIG. 2, a line roller 41 for guiding the fishing line to the spool 4, and a fixed shaft cover 47 fixed to the first bail supporting member 40 sandwiching the line roller 41 are mounted on the tip of the first bail supporting member 40. The line roller 41 is mounted rotatably on the tip of the first bail supporting member 40. The tip of the fixed shaft cover 47 is shaped in a pointed deformed circular cone. A bail 43, which is a wire rod having substantially a curved U-shape, is fixed between the tip portion of the fixed shaft cover 47 and the second bail supporting member 42. The bail arm 17 is made up of the first and the second bail supporting members 40, 42, the line roller 41, the bail 43, and the fixed shaft cover 47 for guiding the fishing line to the spool 4. The bail arm 17 can pivot between the line-winding posture shown in FIG. 2, and the line-releasing posture, which is a reversed posture from the line-winding posture.

Figure 7:
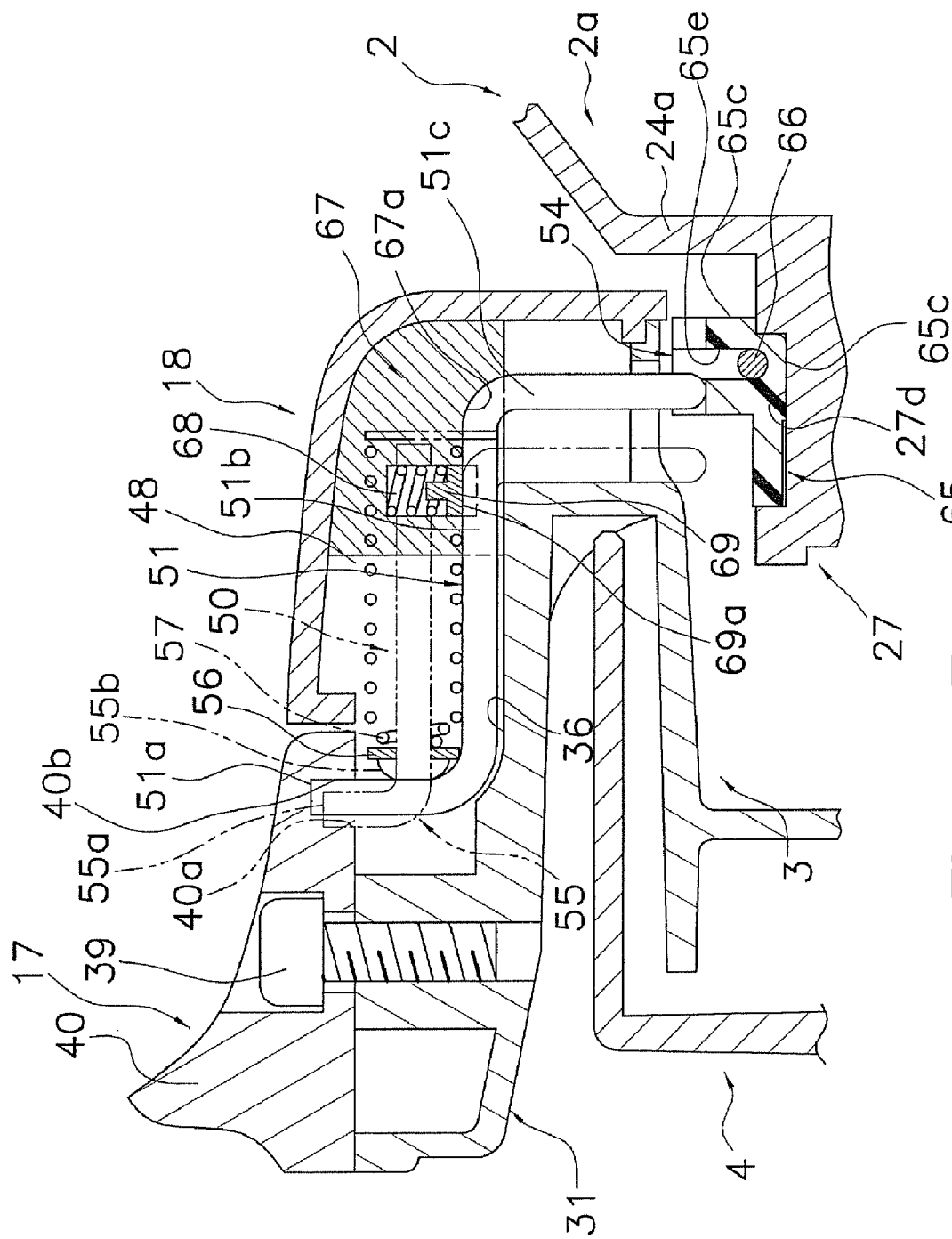
FIG. 7 is a partial sectional view of a first rotor arm, showing the bail tripping mechanism.

As shown in FIG. 7, the bail tripping mechanism 18 is arranged in the interior of the first rotor arm 31. The bail tripping mechanism 18 is provided for restoring the bail arm 17 from the line-releasing posture to the line-winding posture when the rotor 3 starts rotating. The bail tripping mechanism 18 is also provided for holding the bail arm 17 in both the two postures.

As shown in FIG. 7, the bail tripping mechanism 18 includes a toggle spring mechanism 50, a moving member 51, and a rotor braking mechanism 54. The toggle spring mechanism 50 is pivotally mounted on the first rotor arm 31 inside an accommodating space 48 formed in the first rotor arm 31. The moving member 51 is movably mounted approximately to the front and rear inside of the accommodating space 48. This moving member 51 touches the returning member 28. The rotor braking mechanism 54 has the brake member 65 for putting brakes on the rotor 3.

The toggle spring mechanism 50 is arranged in the interior of the first rotor arm 31 so that the bail arm 17 can get into a first position, which is the line-winding posture, and a second position, which is the line-releasing posture. The toggle spring mechanism 50 is a mechanism for holding the bail arm 17 in the line-winding posture and the line-releasing posture. The toggle spring mechanism 50 includes a rod 55 with one end thereof locking with the first bail supporting member 40 and the other end thereof extending along the first rotor arm 31, and a coil spring 57 biasing the rod 55 to the advancing side. The rod 55 has a locking portion 55a bent towards the first bail supporting member 40 to lock with an engaging opening 40a of the first bail supporting member 40 at the tip thereof. In addition, the rod 55 has a locking protrusion 55b at the intermediate portion thereof for locking with the tip portion of the coil spring 57. A washer 56, where the tip of the coil spring 57 is in contact with, is mounted on the locking protrusion 55b, and as a result, the force is transferred evenly from the tip portion of the coil spring 57 to the rod 55.

The moving member 51 is, for example, a member formed by bending the two ends of a wire rod made of metal, such as stainless alloy and the like, in the opposite 90 degrees directions. The moving member 51 is movably mounted approximately to the front and rear in the first rotor arm 31, to a first position shown in two-dot chain line and a second position shown in solid line in FIG. 7. As shown in FIG. 7, the moving member 51 is bent to the outer peripheral side at the tip portion 51a thereof, and is locked with a roughly fan-shaped engaging concave groove 40b formed on the first bail supporting member 40. The intermediate portion 51b extends along the first rod arm 31 more to the inner side radially than the rod 55.

The rear end portion 51c passes through a guide groove 36 formed along the first rotor arm 31 in the front and rear direction, and protrudes inward to a position barely overlapping the brake member 65, which makes up the rotor braking mechanism 54. The width of the guide groove 36 is about the same as the diameter of the moving member 51. For this reason, the inner side of the intermediate portion 51b of the moving member 51 is guided front and rear along the guide groove 36 when the bail arm 17 pivots. The outer peripheral side of the bent portion between the intermediate portion 51b and the rear end portion 51c is guided by a guide member 67 mounted in the interior of the first rotor arm 31, radially and in the front and rear direction. A concave groove 67a, which is curved so that the rear end portion 51c fits in, is formed in the interior of the guide member 67.

A cylindrical mounting opening 67b, for instance, into which a pressing spring 68 made of a coil spring can be fixed, is formed in the guide member 67 and opens into the concave groove 67a. The pressing spring 68 is fixed in the concave groove 67a in the compressed state and biases the rear end portion 51c towards the brake member 65 by pressing the intermediate portion 51b of the moving member 51. A pressing member 69, on which a semicircular arc shaped concave portion 69a is formed to engage with the outer peripheral surface of the intermediate portion 51b of the moving member 51, is mounted on the tip of the pressing spring 68. The pressing member 69 is provided for making the intermediate portion 51b of the moving member 51 movable to the front and rear and for transferring the biasing force of the pressing spring 68 efficiently to the intermediate portion 51b.

The amount of protrusion of the flat portion 29c of the returning portion 29 to which the rear end portion 51c of the moving member 51 is in contact with is set so that when the moving member 51, where the rear end portion 51c thereof touched the first sloped surface 28c, pressed the bail arm 17 towards the line-winding posture, it exceeds the dead center of the toggle spring mechanism 50.

Here, the returning member 28 is mounted to engage with the returning portion 29 for returning the moving member 51 of the bail tripping mechanism 18 from the second position back to the first position, and the first sloped surface 28a is also disposed on the lid portion 2b side. For this reason, the sloped surface in contact with the moving member 51 is not the second sloped surface 29a, but the first sloped surface 28c having a slope more gentle than the second sloped surface 29a. In addition, since the first sloped surface 28c is also disposed on the side of the lid portion 2b, the moving member 51 is guided smoothly on the first sloped surface 28c, which has a gentle slope. Therefore, the return force acting on the handle when the handle 1 is rotated in the line-winding direction is small, and the bail arm 17 can be returned to the line-winding posture with a small force.

The rotor braking mechanism 54 puts brakes on the rotor 3 when the bail arm 17 pivoted into the line-releasing posture, and includes the moving member 51, and the brake member 65 mounted in the mounting groove 27d formed on the side of the base end portion of the cylindrical portion 27. That is, the moving member 51 makes up the bail tripping mechanism 18, and also makes up the rotor braking mechanism 54.

The brake member 65 is provided for putting brakes on the rotation of the rotor 3 when the bail arm 17 is in the line-releasing posture. The brake member 65, for example, is made up of two members of a first brake member 65a and a second brake member 65b, being approximately semicircular and formed of a member made of synthetic resin. The first brake member 65a and the second brake member 65b are attached to the circular mounting groove 27d by a spring member 66 fixed to an annular groove 65e formed on the periphery. The brake member 65 includes a friction portion 65c for frictionally engaging rotatably with the mounting groove 27d, and a plurality of engaging portions 65d with which the rear end portion 51c of the moving member 51 engages. The engaging portions 65d are arranged on the periphery of the brake member 65 at intervals, and are engaging grooves with which the rear end portion 51c engages. In addition, tapered portions 65f are formed on the brake member 65 in a plurality of places in a mountain-like shape sloping towards the engaging portions 65d. The tapered portions 65f are sloped surfaces formed for guiding the rear end portion 51c to the engaging portions 65d.

The spring member 66 is an arc shaped wiry member attached to the annular groove 65e formed on the periphery of the brake member 65 and has an elastic force biasing to the inner side direction. The spring member 66 opens between the two end portions in order to be mounted on the brake member 65 and one end portion thereof is bent radially and locked for retaining itself in the annular groove 65e.

With the bail tripping mechanism 18 having this kind of a configuration, the toggle spring mechanism 50 can move into a first position corresponding to the line-winding posture and a second position corresponding to the line-releasing posture. In addition, the moving member 51 can move to the front and rear, to the first position corresponding to the line-winding posture and the second position corresponding to the line-releasing posture, with the rear end portion 51c thereof guided by the guide groove 36. In the second position, the rear end portion 51c of the moving member 51 engages with the engaging portions 65d of the brake member 65. At this time, the rotor braking mechanism 54 applies the brakes to the rotor 3 by having the brake member 65 rotate with the rotor 3 and the friction portion 65c frictionally engaging the mounting groove 27d.

In addition, in the second position, if the rotor 3 rotates in the line-winding direction by operating the handle 1, the rear end portion 51c of the moving member 51 is in contact with the first sloped surface 28c of the returning member 28, and the moving member 51 is pressed to the front side towards the first position. The bail arm 17 is restored back to the line-winding posture when the dead center of the toggle spring mechanism 50 is exceeded.

As shown in FIG. 2, an anti-reverse mechanism 49 is arranged in the interior of the cylindrical portion 27 of the rotor 3 for prohibiting and cancelling the prohibiting of the reverse rotation of the rotor 3. The anti-reverse mechanism 49 includes a roller type of one-way clutch 52. The rotor 3 is prohibited from, and is also released from being prohibited from rotating reversely, through the one-way clutch 52 being switched to an operating state and a non-operating state, by operating a switching lever 53 arranged below the housing unit 2a.

The spool 4 is arranged between the first rotor arm 31 and the second rotor arm 32 of the rotor 3. The spool 4 is fastened to the front end of the spool shaft 15 with the drag mechanism 7 interposed between them. The spool 4 includes a bobbin trunk portion 4a on which the fishing line is wound around on the periphery thereof, a skirt portion 4b integrally formed with the rear portion of the bobbin trunk portion 4a, and a flange portion 4c integrally formed with the front end of the bobbin trunk portion 4a. The skirt portion 4b is disposed on the outer peripheral side of the cylindrical portion 30 of the rotor 3.

When casting, the rotor 3 is controlled in the reverse prohibited state through the anti-reverse mechanism 49, and manually, the bail arm 17 is held and reversed to the line-releasing posture. When the bail arm 17 is revered into the line-releasing posture, the first bail supporting member 40 and the second bail supporting member 42 are toppled to the rear side, and the bail tripping mechanism 18 is disposed in the second position. With the bail arm 17 toppled into the line-releasing posture, the fishing line can be feed out easily from the spool 4.

During this pivoting from the line-winding posture to the line-releasing posture, in the toggle spring mechanism 50, the rod 55 reaches the second position by pivoting in the counterclockwise direction while gradually backing away, by the rotation of the first bail supporting member 40. The rod 55 keeps on backing away until the dead center is exceeded. When the dead center is exceeded, the rod 55 advances, through the biasing force of the coil spring 57, and the bail arm 17 is switched to the line-releasing posture side while also keeping it in this posture.

When the bail arm 17 pivots into the line-releasing posture, the rear end portion 51c of the moving member 51 engages with the engaging portions 65d of the brake member 65, along with this pivoting. And, when the brake member 65 rotates with the rotor 3, the friction portion 65c frictionally engages with the mounting groove 27d, and thus, brakes are put on the rotor 3.

In this state, the fishing rod is cast out while the fishing line is being caught by the index finger of the angler holding the fishing rod. As a result, the fishing line is released out vigorously with the weight of the tackle.

After the fishing rod is cast out, if the handle 1 is rotated in the line-winding direction in the state that the bail arm 17 is being kept in the line-releasing posture, the rotor 3 rotates in the line-winding direction (direction of the arrows in FIGS. 4 and 5) with the brake member 65 by the rotor drive mechanism 5. When the rotor 3 rotates in the line-winding direction, the bail arm 17 is restored back into the line-winding direction by the bail tripping mechanism 18. At this time, as described previously, since the returning member 28 is mounted in the gap 27b between the rear surface 27a of the cylindrical portion 27 and the front surface 24c of the second flange portion 24b, and the first sloped surface 28c is arranged to cover the second sloped surface 29a of the returning portion 29, the position where the rear end portion 51c of the moving member 51 touches the sloped surface moves to the lid portion 2b side, compared to if the returning member 28 is not provided. For this reason, since the slope of the first sloped surface 28c being in contact becomes gentle, the bail arm can be returned with a small force, and this reduces the discomfort when turning the handle 1.

Moreover, since the plate-like arranging portion 28a of the returning member 28 can be arranged in the gap 27a between the second flange portion 24b and the cylindrical portion 27, by inserting the plate-like arranging portion in the gap 27b between the cylindrical portion 27 and the second flange portion, the returning member 28 can be fixed by being sandwiched between the cylindrical portion and the second flange portion 24b. Since this arranging portion 28a is in a plate-like shape, concentration of stress will not occur easily, and the space for fixing the returning member 28 can be reduced.

In addition, by mounting the returning member 28 in the reel unit 2 in which the returning portion 29 that has the second sloped surface 29a is already formed, the third sloped surface 28i of the returning member 28 engages with the second sloped surface 29a of the returning portion 29, and the returning portion 29 is covered by the returning member 28. By doing so, the sloped surface with which the moving member 51 of the bail tripping mechanism 18 is in contact is not the second sloped surface 29a, but the first sloped surface 28c having a slope that is more gentle than the second sloped surface 29a. For this reason, even with the reel unit 2 with which the returning portion 29 is formed integrally, by mounting the returning member 28, the sloped surface with which the moving member 51 is in contact with is the first sloped surface 28c and not the second sloped surface 29a, and the slope of the contacting sloped surface becomes gentle, and the slope of the sloped surface can be changed.

Furthermore, since the sloped surface with which the moving member is in contact can be changed just by mounting the housing unit and the returning member, being a separate body from the lid portion, afterwards, the slope of the sloped surface can be changed by adding afterwards the returning member to the existing reel unit that has the returning portion.

In addition, in this embodiment, the returning member 28 is mounted prior to the lid portion 2b is fixed to the housing unit 2a, with mechanisms such as the rotor drive mechanism 5 and the oscillating mechanism 6 being housed in the mechanism accommodating space 26. The returning member 28 is mounted on the second flange portion 24b in the state that the projections 28g, 28h are locked with the horizontal edge portion 24e and the vertical edge portion 24f of the cutout portion 24d of the second flange portion 24b, and in this state, the lid portion 2b is fixed by three fastening bolts 38 inserted from the housing unit 2a. By doing so, the returning member 28 is detachably mounted in the gap 27b between the front surface 24c of the second flange portion 24b and the rear surface 27a of the cylindrical portion 27.

In addition, if different types of returning members that change the slope of the first sloped surface 28c are prepared, it becomes possible to alter the angle of the sloped surface according to the size or model of the reel.

Other Embodiments (a) In the above embodiment, although the rod attachment leg portion 2c is formed integrally on the lid portion 2b, the rod attachment leg portion 2c may be formed integrally on the housing unit 2b.

Figure 8:
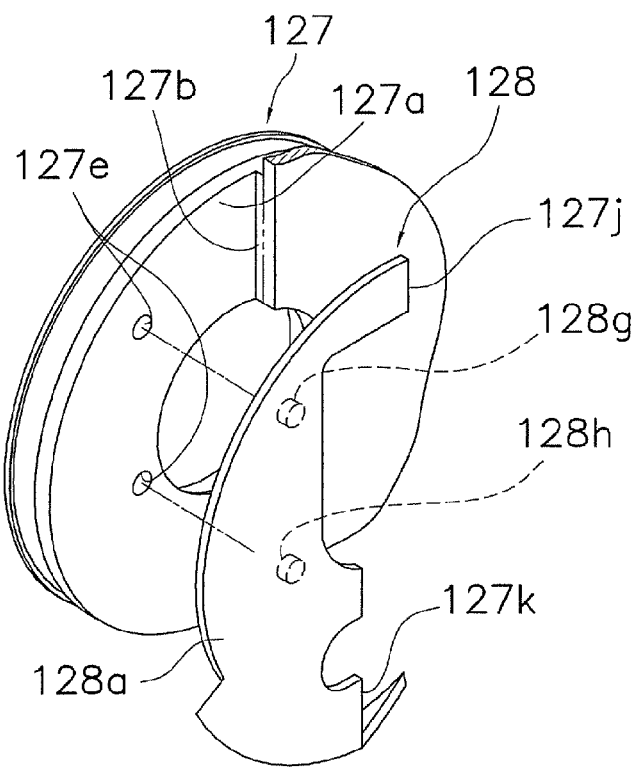
FIG. 8 is a drawing equivalent to FIG. 6 of another embodiment.

(b) In the above embodiment, although the projections 28g, 28h formed protruding out on the rear surface of the returning member 28 are locked to the cutout portion 24d of the second flange portion 24b, the present invention is not limited to this kind of a structure. For example, as shown in FIG. 8, the configuration may have at least one (for example, two) cylindrical projections (an example of a fitting portion) 128g, 128h formed on the front surface of the arranging portion 128a of the returning member 128, and to have them fitted into concave portions 127e formed on the rear surface 127a of the cylindrical portion 127.

In this case, the projections may be formed on the rear surface of the returning member 128, and they may be fitted into concave portions formed on the second flange portion. In addition, if the projections are not cylindrical and the section thereof is not circular, it is possible to position them on a plane, and thus, there may be only one projection and one concave portion. Furthermore, there may be only one projection even with the cylindrical projections, since a detent is not necessary if the inner side edges 127j, 127k of the returning member are positioned by being in contact with the end surface of the gap 127b.

If the projections 128g, 128h are provided on the returning member 128, prior to fixing the lid portion onto the housing unit, it is only necessary to attach the returning member 128 from the rear side onto the cylindrical portion 127, and then screw to fix the lid portion to the housing unit. In addition, in the following description, since the configuration and operation of the members not described are same as those described in the above embodiment, the description thereof is omitted.

Figure 9:
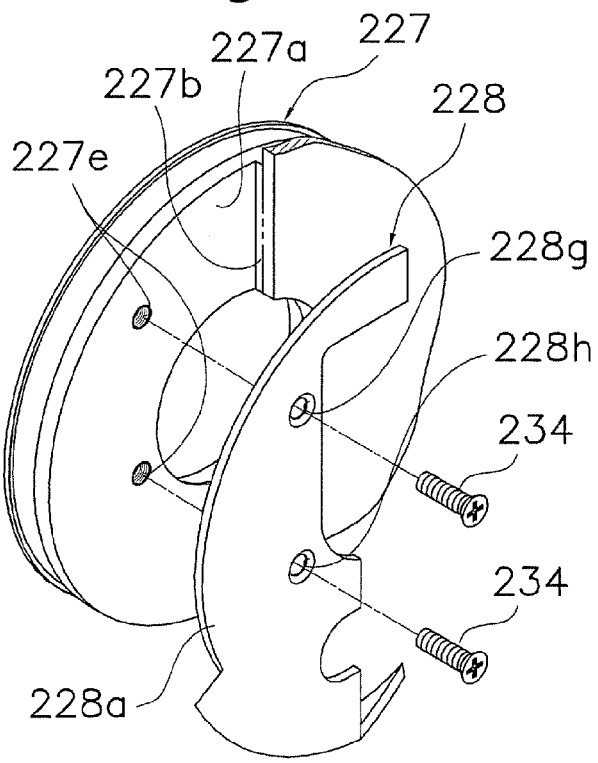
FIG. 9 is a drawing equivalent to FIG. 6 of still another embodiment.

(c) In the above described embodiment, although the returning member is configured to lock with or fit with the first flange portion or the cylindrical portion, as shown in FIG. 9, the returning member 228 may be fixed to the rear surface 227a of the cylindrical portion 227 by being screwed by screw members 234, such as countersunk screws. At least one (for example, two) tapered counterbore holes 228g, 228h with which the screw members 234 engage are formed at intervals on the rear surface of the arranging portion 228a of the returning member 228. In this case, the screw holes 227e may be formed on the cylindrical portion 227, or they may simply be holes instead of the screw holes if tapping screws are used. In addition, the screw holes or the holes may be formed on the second flange portion side and not the cylindrical portion 227, and the returning member may be fixed to the second flange portion by the screw members from the front side of the returning member. Furthermore, there may be only one screw member, since a detent is not necessary if the inner side edges 228j, 228k of the returning member 228 are positioned by being in contact with the end surface of the gap 227b.

If the returning member 228 is fixed by being screwed to the cylindrical portion 227, prior to fixing the lid portion to the housing unit, it is only necessary to screw the returning member 228 to the cylindrical portion 227, and then screw the lid portion onto the housing unit.

Figure 10:
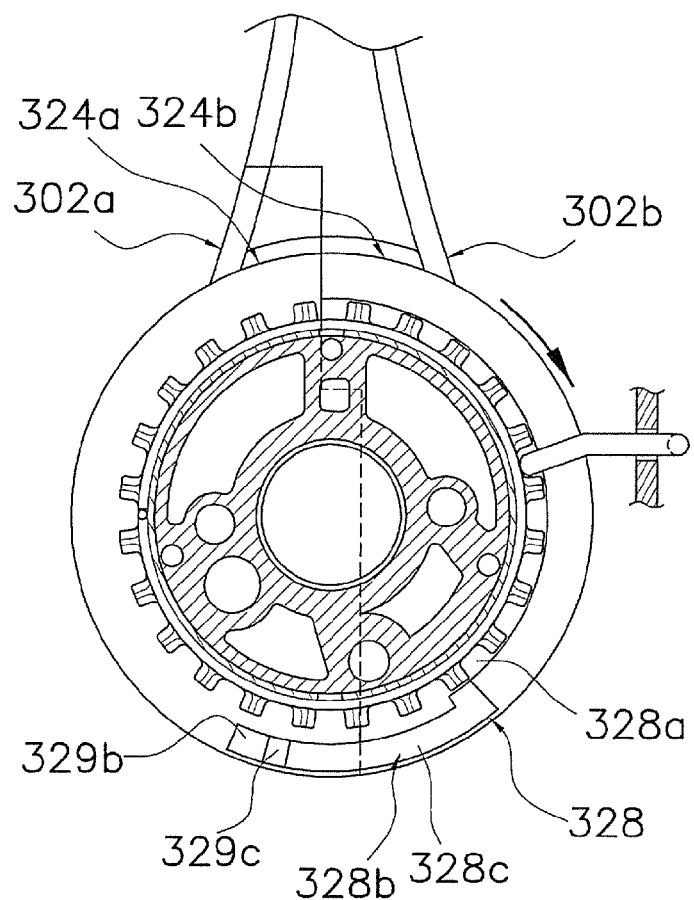
FIG. 10 is a drawing equivalent to FIG. 4 of still another embodiment.
Figure 11:
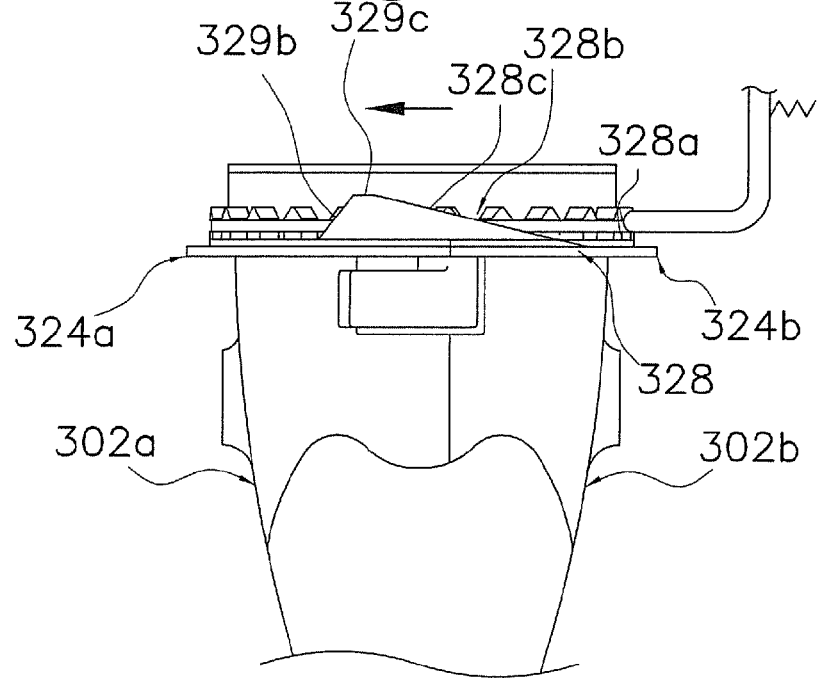
FIG. 11 is a drawing equivalent to FIG. 5 of still another embodiment.

(d) In the above described embodiment, this invention was described in which the returning portion is included in the first flange portion, as an example. However, if the returning portion is not included in the first flange portion, a portion corresponding to the returning portion may be formed integrally with the returning member. In FIGS. 10 and 11, the returning member 328 includes an arranging portion 328a arranged in the gap 327b formed between the second flange portion 324a of the lid portion 302b and the cylindrical portion 327, and a protrusion 328b extending from the arranging portion 328a to a position opposite the first flange portion 324a of the housing unit 302a. The arranging portion 328a has the same configuration as that described in the above embodiment. The protrusion 328b includes a first sloped surface 328c, a third sloped surface 329b, and a flat surface 329c. The first sloped surface 328c is the same as that described in the above embodiment. The third sloped surface 329b and the flat surface 329c are the same as those formed on the returning portion 29. Therefore, in this embodiment, the shape of the protrusion 328b is as if the protrusion 28b and the returning portion 29 of the above embodiment are formed integrally. In this case, since a contacting surface with which the moving member 51 touches is provided on the returning member 328, which is a separate body, stress is prevented from being concentrated on the arranging portion, and sloped surfaces with various slopes can be prepared. In addition, in this embodiment, although the first sloped surface 328c is added to the protrusion 328b, and the third sloped surface 329b and the flat surface 329c are formed, the sloped surface that is necessary on the protrusion 328b is the first sloped surface 328c, and the third sloped surface 329b and the flat surface 329c do not have to be formed on the protrusion 328b.

The term "configured" as used herein to describe a component, section or part of a device includes hardware that is constructed to carry out the desired function.

Moreover, terms of degree such as "substantially", "somewhat", "approximately" and "roughly" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reel unit for a spinning reel having a spool and a rotor with a bail tripping mechanism, the bail tripping mechanism arranged to return a bail arm, pivotable between a line-winding posture and a line-releasing posture, from the line-releasing posture to the line-winding posture, the spool arranged to moved forward and rearward along a spool shaft, the reel unit comprising:

a housing unit including a cylindrical portion, a first flange portion and a mechanism accommodating space, the cylindrical portion disposed on a front portion the housing unit so that the center of the cylindrical portion coincides with the center of a rotation shaft of the rotor, the first flange portion arranged behind the cylindrical portion, the first flange portion having a substantially semicircular shape and the center that coincides with the center of the cylindrical portion, the mechanism accommodating space formed in a rear side of the first flange portion;

a lid portion having a second flange portion with a substantially semicircular shape, the second flange portion forming a circular shape with the first flange portion, the first and second flange portions arranged behind and forming a gap with a rear surface of the cylindrical portion, the lid portion detachably coupled to the housing unit so as to cover the mechanism accommodating space;

a rod attachment leg portion disposed on either the housing unit or the lid portion; and a returning member detachably mounted in the gap between the cylindrical portion and the second flange portion, the returning member returning the bail arm from the line-releasing posture to the line-winding posture, the returning member includes a plate-like arranging portion and a protrusion, the arranging portion disposed in the gap between the cylindrical portion and the second flange portion, the protrusion gradually protruding from a front side of the arranging portion to face the first flange portion along the line-winding direction of the rotor, the protrusion has a first sloped surface contactable with the bail tripping mechanism.

2. The reel unit according to claim 1, wherein the first flange portion further has a returning portion returning the bail arm from the line-releasing posture to the line-winding posture, the returning portion including a second sloped surface formed on a front surface of the first flange portion along the line-winding direction, the second sloped surface being steeper than the first sloped surface.

3. The reel unit according to claim 2, wherein the protrusion further has a third sloped surface positioned to face and engage with the second sloped surface.

4. The reel unit according to claim 1, wherein a cutout portion formed on the inner peripheral side of the second flange portion.

5. The reel unit according to claim 4, wherein the arranging portion has at least one projection locked to an edge portion of the cutout portion of the second flange portion and is sandwiched by the second flange portion and the cylindrical portion.

6. The reel unit according to claim 1, wherein the arranging portion has at least one fitting portion that fits with either the cylindrical portion or the second flange portion and is sandwiched by the second flange portion and the cylindrical portion.

7. The reel unit according to claim 6, wherein the at least one fitting portion include projection(s) that fit into a concave portion formed on either the cylindrical portion or the second flange portion.

8. The reel unit according to claim 1, wherein the arranging portion fixedly coupled to either the cylindrical portion or the second flange portion.

9. A spinning reel comprising:

a spool;

a rotor arranged to guide a fishing line on a peripheral surface of the spool, the rotor having a bail arm, pivotable between a line-winding posture and a line-releasing posture, and a bail tripping mechanism arranged to return the bail arm from the line-releasing posture to the line-winding posture, the spool arranged to moved forward and rearward along a spool shaft; and a reel unit configured to rotatably support the rotor, the reel unit including a housing unit including a cylindrical portion, a first flange portion and a mechanism accommodating space, the cylindrical portion disposed on a front portion the housing unit so that the center of the cylindrical portion coincides with the center of a rotation shaft of the rotor, the first flange portion arranged behind the cylindrical portion, the first flange portion having a substantially semicircular shape and the center that coincides with the center of the cylindrical portion, the mechanism accommodating space formed in a rear side of the first flange portion;

a lid portion having a second flange portion with a substantially semicircular shape, the second flange portion forming a circular shape with the first flange portion, the first and second flange portions arranged behind and forming a gap with a rear surface of the cylindrical portion, the lid portion detachably coupled to the housing unit so as to cover the mechanism accommodating space;

a rod attachment leg portion disposed on either the housing unit or the lid portion; and a returning member detachably mounted in the gap between the cylindrical portion and the second flange portion, the returning member returning the bail arm from the line-releasing posture to the line-winding posture, the returning member includes a plate-like arranging portion and a protrusion, the arranging portion disposed in the gap between the cylindrical portion and the second flange portion, the protrusion gradually protruding from a front side of the arranging portion to face the first flange portion along the line-winding direction of the rotor, the protrusion has a first sloped surface contactable with the bail tripping mechanism.

* * * * *